United States Patent
Li

(10) Patent No.: US 11,724,774 B2
(45) Date of Patent: Aug. 15, 2023

(54) AUTOMATIC DOWNSHIFTING AND VARIABLE SPEED TRANSMISSION BICYCLE

(71) Applicant: Shoujin Li, Sichuan (CN)

(72) Inventor: Shoujin Li, Sichuan (CN)

( * ) Notice: Subject to any disclaimer, the term of this patent is extended or adjusted under 35 U.S.C. 154(b) by 28 days.

(21) Appl. No.: 17/349,955

(22) Filed: Jun. 17, 2021

(65) Prior Publication Data

US 2022/0297797 A1    Sep. 22, 2022

(30) Foreign Application Priority Data

Mar. 19, 2021   (CN) .......................... 202110293982.8

(51) Int. Cl.
  *B62M 11/16*   (2006.01)
  *B62M 9/12*    (2006.01)
  *B62M 25/04*  (2006.01)

(52) U.S. Cl.
  CPC .............. *B62M 11/16* (2013.01); *B62M 9/12* (2013.01); *B62M 25/04* (2013.01)

(58) Field of Classification Search
  CPC ..... B62M 11/14; B62M 11/145; B62M 11/16; B62M 11/18; B62M 9/12; B62M 25/04; F16D 41/30
  See application file for complete search history.

(56) References Cited

U.S. PATENT DOCUMENTS

| 8,684,122 B2 * | 4/2014 | Maeno ..................... F16D 41/30 |
| | | 180/205.1 |
| 2014/0300078 A1 * | 10/2014 | Ruffieux .................. B62L 5/006 |
| | | 474/1 |
| 2016/0362160 A1 * | 12/2016 | Van Druten ............. B62K 3/02 |

FOREIGN PATENT DOCUMENTS

| CN | 112977709 A | 6/2021 |
| WO | WO-2011102606 A2 * | 8/2011 | .......... B62M 11/145 |

* cited by examiner

*Primary Examiner* — Lori Wu

(57) ABSTRACT

The invention discloses an automatic downshifting and variable speed transmission bicycle, comprising a bicycle stand, wherein the bicycle stand is installed with a bottom bracket; the bottom bracket is installed with a bottom bracket sprocket set, and the bottom bracket sprocket set is composed of three chain discs of different sizes; a rear axle of the bicycle is provided with a tower footing, and the tower footing is fixedly installed with a sun gear; one side of the sun gear is provided with a planet carrier, and the planet carrier is installed with planetary twin gears. The invention is easy to start, can run at high speed, has multiple functions, and is reliable in operation, with convenient maintenance and low cost, and is energy saving and environmental-friendly; it has a good market prospect and brings great convenience to cyclists.

5 Claims, 4 Drawing Sheets

AUTOMATIC DOWNSHIFTING AND VARIABLE SPEED TRANSMISSION BICYCLE

BACKGROUND OF THE INVENTION

1. Field of the Invention

The invention relates to the technical field of bicycles, in particular to an automatic downshifting and variable speed transmission bicycle.

2. Description of the Related Art

The transmission system of the bicycle is a very important part of the bicycle, and its function is mainly to transmit the power of the human body to the wheel system of the bicycle, so that the bicycle can generate the power that can run.

At present, bicycle transmission systems are mainly divided into two categories, one is a variable speed transmission system, and the other is a single speed transmission system. The type of transmission system selected for different road conditions and different riding methods is also inconsistent. In addition, there are two-level or multi-level transmissions in order to achieve higher speeds. The disadvantage of the first-level single speed bicycles in the prior art is that they run slowly; after all, ordinary variable speed bicycles also have a first-level transmission speed and are not very fast; bicycles above two-level can run fast, but have difficulty in starting. There is also an internal change, which is also a two-level variable speed bicycle. The internal change is like the transmission of a car gearbox. This kind of transmission is not only complicated but also expensive, the maintenance price is also very expensive, the minimum speed ratio is also above 1:2, it is more difficult to ride on steep slopes, and it is not suitable for all terrain, so it is rarely used now. Ordinary bicycles in the prior art, whether single speed or variable speed, have a first-level gear ratio, so the speed is not very fast. For bicycle enthusiasts with extraordinary physical abilities, they cannot give full play to the happiness brought by speed. The current Chinese patent ZL 2019 2 212295.X (A Variable Speed Transmission Bicycle) can basically solve the contradiction between easy starting and high-speed running of bicycles, but the increased gear ratio of inter-level gearing (that is, change from the first-level transmission state to the second-level transmission state) during the level change process is about 1:3, which cannot be lower. In this way, the gear ratio changes too much during the step change, which makes the riding experience of the rider with average physical strength not very good; in addition, when parking and restarting, manual operation is required to slow down the transmission system to the first-level transmission state, otherwise it will be more difficult to start, so the riding experience is not perfect.

SUMMARY OF THE INVENTION

In order to solve the shortcomings existing in the prior art, the invention provides an automatic downshifting and variable speed transmission bicycle, which is easy to start and move uphill, and can be ridden at a high speed; has simple technology; easy to operate and is reliable; with convenient maintenance and low cost; energy-saving and environmentally friendly.

The specific technical solutions are as follows:

an automatic downshifting and variable speed transmission bicycle, comprising a bicycle stand, wherein the bicycle stand is installed with a bottom bracket; the bottom bracket is installed with a bottom bracket sprocket set, and the bottom bracket sprocket set is composed of three chain discs of different sizes;

a rear axle of the bicycle is provided with a tower footing, and the tower footing is fixedly installed with a sun gear; one side of the sun gear is provided with a planet carrier, and the planet carrier is installed with planetary twin gears; the axial outer side of the planet twin gears is matched with a ring gear;

the axial outer side of the planet carrier is provided with a ratchet wheel, and the ratchet wheel is matched with a pawl; the pawl is installed on the bicycle stand; the control of the pawl is adjusted by the speed governor next to the handlebar of the bicycle to which a variable speed wire rope is drawn, and the pawl and the ratchet wheel are separated or combined to switch between the primary transmission state and the secondary transmission state through the retraction and extension of the variable speed wire rope; the axial outer side of the ring gear is provided with a pin coupling A, and main sprockets are further installed side by side beside the ring gear; the inside of the main sprocket is installed with a one-way bearing; the main sprocket is further provided with a pin coupling B; the pin coupling A on the ring gear and the pin coupling B on the main sprocket are installed in cooperation, which enables the main sprocket to effectively provide power for the planetary transmission.

Further, the planet carrier is provided with three or more sets of planetary twin gears; the planetary twin gears are matched in the planet carrier; the planetary carrier is equipped with planetary twin gears to adapt that the steering of the ring gear as an active bicycle transmission system is consistent with the steering of the sun gear; the active ring gear is to reduce the gear ratio of the planetary transmission (the gear ratio of the secondary transmission is reduced from about 1:3 by the planet carrier as an active system to about 1:2; if the primary transmission is set to i1=1.5, the active bicycle speed ratio of the planet carrier during the secondary transmission is i=1.5*3=4.5, and the active speed ratio of the ring gear is i=1.5*2=3; obviously a speed ratio of 4.5 is suitable for power riders, and a speed ratio of 3 is more suitable for ordinary people.), which reduces the lowest gear ratio of the bicycle in the secondary transmission, so as to improve the experience of ordinary riders.

Further, the sun gear is fixed on the tower footing of the rear axle of the bicycle; the ring gear and the planet carrier are respectively located on both sides of the sun gear.

Further, the main sprocket is connected to a power input system composed of the bottom bracket sprocket set via a chain; when the ratchet wheel and the pawl are separated, the ratchet wheel follows the main sprocket to rotate, and the planetary transmission does not intervene in operation; at this time, the power is directly transmitted by the main sprocket through the one-way bearing to the tower footing to drive the bicycle forward, so a bicycle primary transmission system is constituted.

Further, the main sprocket is connected to a power input system composed of the bottom bracket sprocket set via a chain. When the ratchet wheel and the pawl of the planet carrier are combined, the planet carrier cannot follow the main sprocket to rotate, and the power at this time is transmitted from the main sprocket to the ring gear through the pin coupling; since the planet carrier is fixed, the ring gear drives the planet twin wheels and then the sun gear drives the tower footing to finally drive the bicycle forward, which forms a secondary bicycle transmission system; at this time, the speed of the tower footing is higher than the input speed of the main sprocket, and the contradiction of the two coaxial parts with different speeds is solved due to the use of the one-way bearing.

Further, the movement of the pawl is adjusted by the speed governor next to the handlebar of the bicycle to which a variable speed wire rope is drawn, and the pawl and the ratchet wheel are separated or combined through the retraction and extension of the variable speed wire rope.

Further, the inside of the main sprocket is installed with a one-way bearing.

Further, the direction of the variable speed wire rope is parallel to a rear brake wire rope; a linkage device (refer to FIG. 4) is installed between the two wire ropes; the brake linkage device comprises a variable speed wire rope, a variable speed wire rope weight, a brake wire rope, a linkage rod, and a variable speed wire rope weight base; during the braking process of a rear brake device, the variable speed device is activated and switched to primary transmission, and the process of automatic downshift is completed. The variable speed wire rope weight allows the variable speed wire rope to move only in one direction when the transmission system is switched to the secondary transmission state, so that the state of the secondary transmission can be kept stable; when the front end (the end with the smaller size) of the variable speed wire rope weight moves inward under the action of the return spring, the variable speed wire rope will move in the reverse direction, which causes the separation of the ratchet wheel and the pawl, and adjusts the secondary transmission state of the bicycle to the primary transmission state. The bicycle brake wire rope and the variable speed wire rope weight can be linked together to realize automatic downshifting when braking, which solves the problem that the gear is too high and difficult to start when the bicycle is restarted after parking, and improves the riding experience.

After adopting the above technical solutions, the invention has the following advantageous effects:

The invention is easy to start, can run at high speed, has multiple functions, and is reliable in operation, with convenient maintenance and low cost, and is energy saving and environmental-friendly; it has a good market prospect and brings great convenience to cyclists. The invention integrates the characteristics of the primary and secondary transmissions, and realizes that the bicycle can be easily started and moved uphill, and can be ridden at high speed; it can automatically convert from the secondary transmission state to the primary transmission state when the riding slows down and in the parking state, so as to ensure that the bicycle has a better riding experience.

Figure 1:
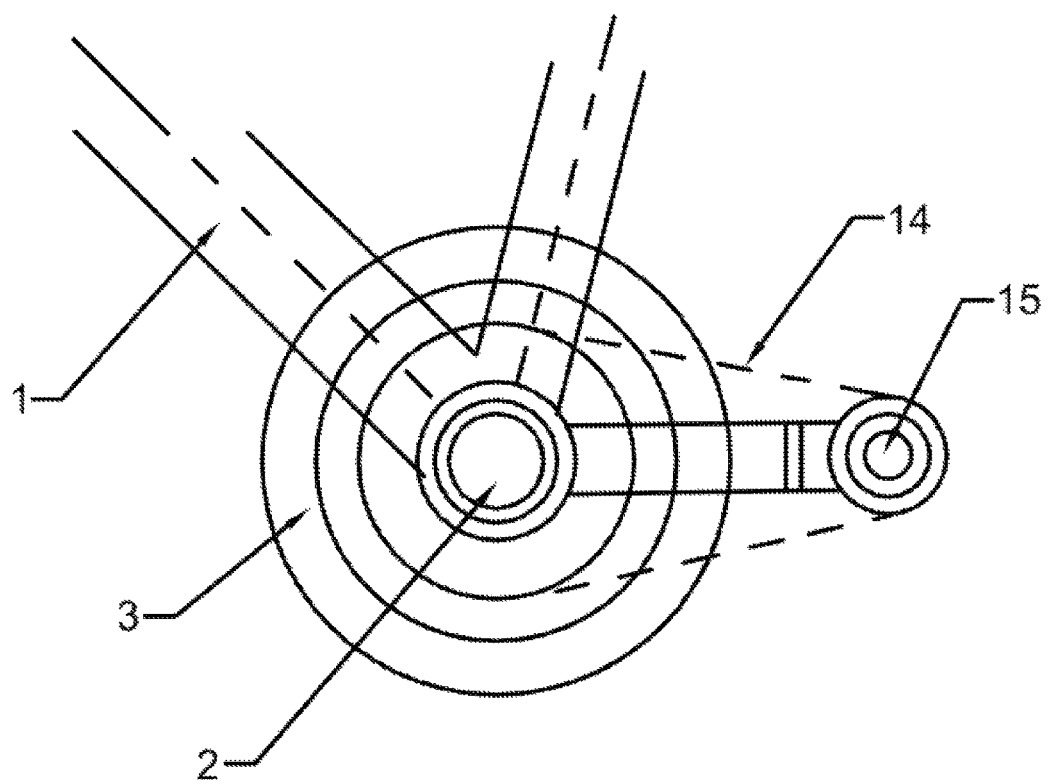
FIG. 1 is a schematic diagram of the structure of the bottom bracket of the automatic downshifting and variable speed transmission bicycle.
Figure 2:
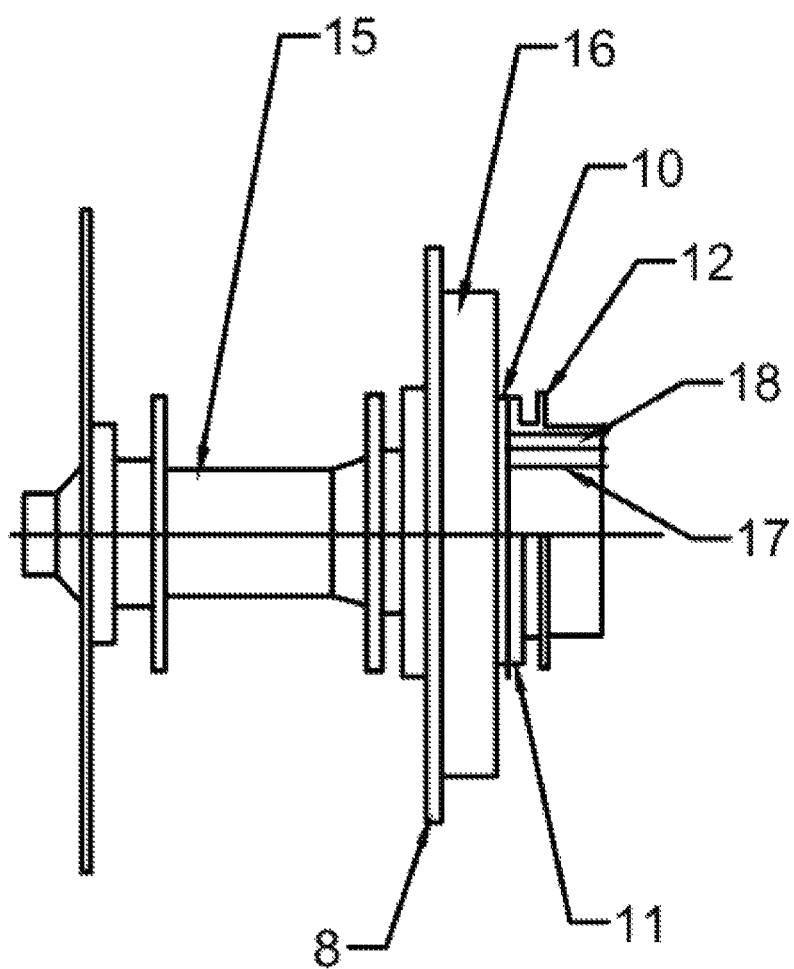
FIG. 2 is a schematic diagram of the structure of the planetary transmission of the automatic downshifting and variable speed transmission bicycle.
Figure 3:
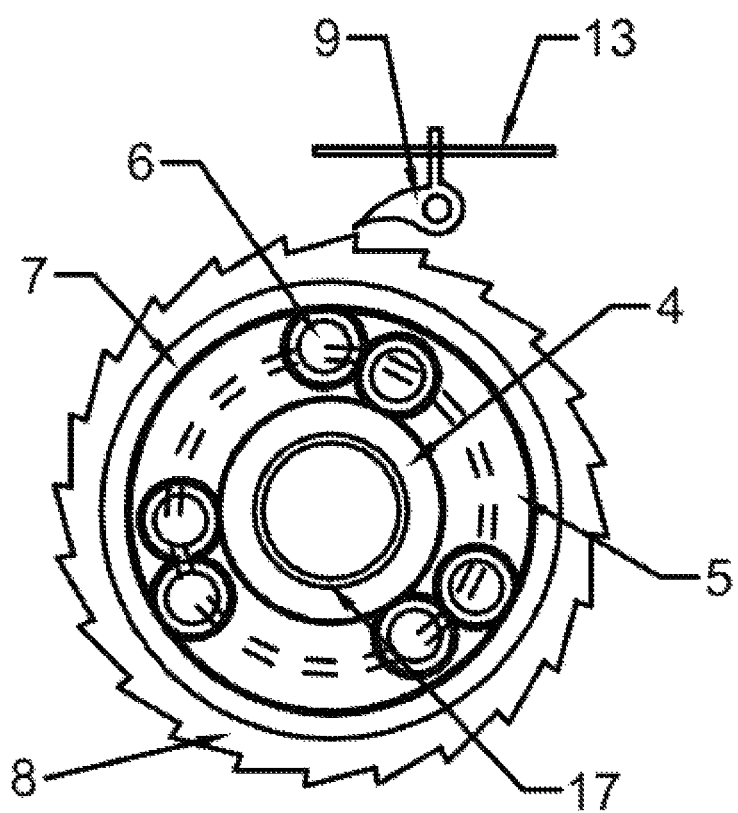
FIG. 3 is a schematic diagram of the structure of the rear axle of the automatic downshifting and variable speed transmission bicycle.

In the figures, 1 refers to the bicycle stand; 2 refers to the bottom bracket; 3 refers to the bottom bracket sprocket set; 4 refers to the sun gear; 5 refers to the planet carrier; 6 refers to the planetary twin gear; 7 refers to the ring gear; 8 refers to the ratchet wheel; 9 refers to the pawl; 10 refers to the pin coupling A; 11 refers to the pin coupling B; 12 refers to the main sprocket; 13 refers to the variable speed wire rope; 14 refers to the chain; 15 refers to the rear axle; 16 refers to the planetary transmission; 17 refers to the tower footing; 18 refers to the one-way bearing; 19 refers to the variable speed wire rope weight; 20 refers to the brake wire rope; 21 refers to the linkage rod; 22 refers to the variable speed wire rope weight base.

DETAILED DESCRIPTION OF THE PREFERRED EMBODIMENTS

The invention will be further described hereinafter with reference to the drawings.

Embodiment 1: as shown in FIG. 1 to FIG. 4, an automatic downshifting and variable speed transmission bicycle, comprising a bicycle stand 1, wherein the bicycle stand 1 is installed with a bottom bracket 2; the bottom bracket 2 is installed with a bottom bracket sprocket set 3, and the bottom bracket sprocket set 3 is composed of three chain discs of different sizes;

a rear axle 15 of the bicycle is provided with a tower footing 17, and the tower footing 17 is fixedly installed with a sun gear; one side of the sun gear is provided with a planet carrier, and the planet carrier is installed with planetary twin gears; the axial outer side of the planet twin gears is matched with a ring gear;

the axial outer side of the planet carrier is provided with a ratchet wheel, and the ratchet wheel is selectively engaged with a pawl; the pawl is installed on the bicycle stand 1; the control of the pawl is adjusted by the speed governor next to the handlebar of the bicycle to which a variable speed wire rope 13 is drawn, and the pawl and the ratchet wheel are separated or combined to switch between the primary transmission state and the secondary transmission state through the retraction and extension of the variable speed wire rope 13; which enables the main sprocket 12 to effectively provide power for the planetary transmission 16.

The planet carrier is provided with three or more sets of planetary twin gears; the planetary twin gears are matched in the planet carrier; the planetary carrier is equipped with planetary twin gears to adapt that the steering of the ring gear as an active bicycle transmission system is consistent with the steering of the sun gear; the active ring gear is to reduce the gear ratio of the planetary transmission 16 (the gear ratio of the secondary transmission is reduced from about 1:3 by the planet carrier as an active system to about 1:2), which reduces the lowest gear ratio of the bicycle in the secondary transmission, so as to improve the experience of ordinary riders.

The sun gear 4 is fixed on the tower footing 17 of the rear axle 15 of the bicycle; the ring gear 7 and the planet carrier 5 are respectively located on both sides of the sun gear 4.

The main sprocket 12 is connected to a power input system composed of the bottom bracket sprocket set 3 via a chain 14; when the ratchet wheel 8 and the pawl 9 are separated, the ring gear 7 follows the main sprocket 12 to rotate, and the planetary transmission 16 does not intervene in operation; at this time, the power is directly transmitted by the main sprocket 12 through the one-way bearing 18 to the tower footing 17 to drive the bicycle forward, so a bicycle primary transmission system is constituted. Since the bottom bracket sprocket set 3 has three sprockets of different sizes, the primary transmission system has three different speed ratios.

A variable speed wire rope weight 19 is installed between the pawl 9 and the variable speed wire rope 13, and the variable speed wire rope weight 19 allows the variable speed wire rope 13 to move in one direction only. When the front end (the end with the smaller size) of the variable speed wire rope weight 19 moves inward, the variable speed wire rope 13 will move in the reverse direction, which causes the separation of the ratchet wheel and the pawl, and adjusts the secondary transmission state of the bicycle to the primary transmission state. The bicycle brake wire rope and the variable speed wire rope weight can be linked together to realize automatic downshifting when braking, which solves the problem that the gear is too high and difficult to start when the bicycle is restarted after parking, and improves the riding experience.

The main sprocket 12 is connected to a power input system composed of the bottom bracket sprocket set 3 via a chain 14. When the ratchet wheel 8 and the pawl 9 of the planet carrier are combined, the planet carrier 5 cannot follow the main sprocket 12 to rotate; at this time, the main sprocket 12 drives the ring gear 7 of the planetary transmission 16 to rotate together through the pin coupling. Since the planet carrier 5 is fixed, the ring gear 7 can only drive the sun gear 4 to rotate in the same direction through the planetary twin gears 6, and the planetary transmission 16 intervenes in the transmission system to form a secondary transmission system of the bicycle. At this time, the speed of the tower footing 17 is higher than the speed of the main sprocket 12, and the contradiction of the two coaxial parts with different speeds is solved due to the use of the one-way bearing 18. The ratchet wheel 8 can only fix the planet carrier 5 in one direction, so the bicycle can still complete chain back in the secondary transmission state.

Since the bottom bracket sprocket set 3 has three sprockets of different sizes, the primary transmission system has three different speed ratios, and the bicycle has a total of six different speed ratios to choose from during riding.

Figure 4:
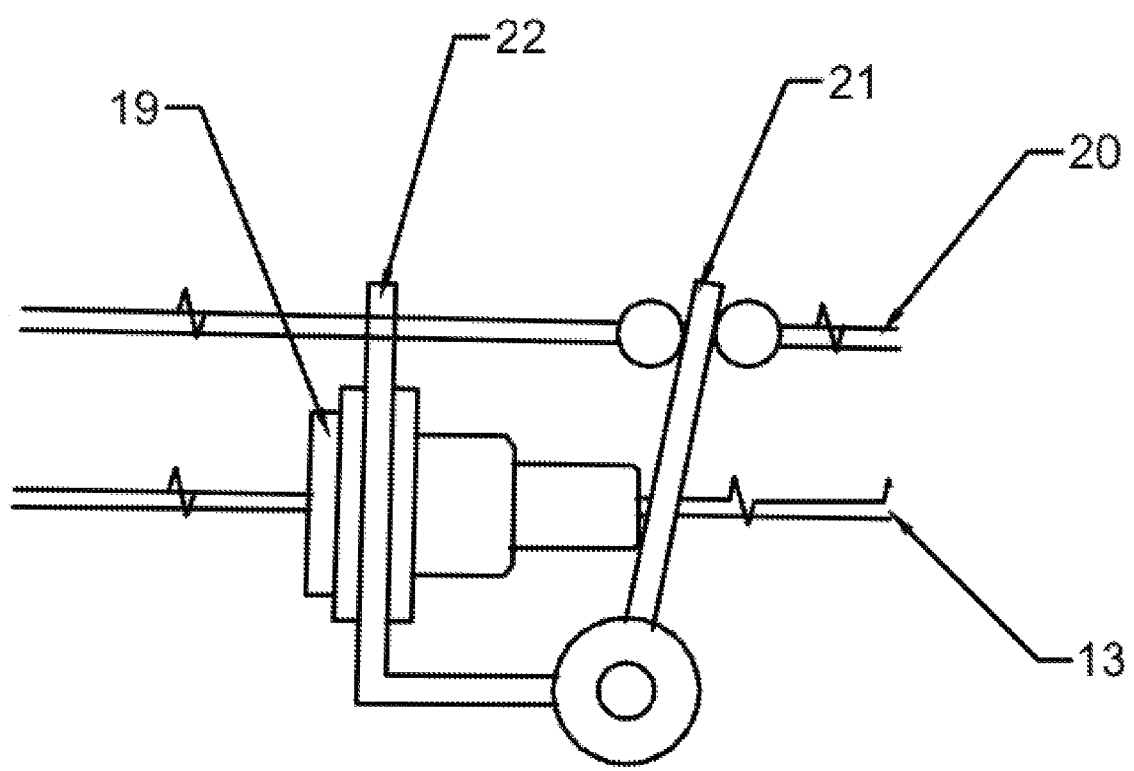
FIG. 4 is a schematic diagram of the structure of the brake downshift linkage device of the automatic downshifting and variable speed transmission bicycle.

The control of the pawl 9 is adjusted by the speed governor next to the handlebar of the bicycle to which a variable speed wire rope 13 is drawn A variable speed wire rope weight 19 is installed between the pawl 9 and the variable speed wire rope 13, and a brake downshift linkage device is installed in the rear brake device of the bicycle, as shown in FIG. 4. The brake linkage device comprises a variable speed wire rope, a variable speed wire rope weight 19, a brake wire rope 20, a linkage rod 21, and a variable speed wire rope weight base 22; during the braking process of a rear brake device, the variable speed device is activated and switched to primary transmission, and the process of automatic downshift is completed. The variable speed wire rope weight 19 allows the variable speed wire rope 13 to move in one direction only. When the front end (the end with the smaller size) of the variable speed wire rope weight 19 moves inward, the variable speed wire rope 13 will move in the reverse direction, which causes the separation of the ratchet wheel 8 and the pawl 9, and adjusts the secondary transmission state of the bicycle to the primary transmission state. The bicycle brake wire rope 20 and the variable speed wire rope weight 19 can be linked together to realize automatic downshifting when braking, which solves the problem that the gear is too high and difficult to start when the bicycle is restarted after parking, and improves the riding experience.

The invention integrates the characteristics of the primary and secondary transmissions, and solves the problem that the bicycle can be easily started and moved uphill, and can be ridden at high speed; due to the brake variable speed linkage device, it can automatically convert from the secondary transmission state to the primary transmission state when the riding slows down and in the parking state, so as to ensure that the bicycle has a better riding experience.

The invention retains the primary transmission system, so the transmission efficiency of the bicycle is improved as much as possible, and the minimum speed ratio can be about 1:1.5 or less, which not only improves the starting and uphill moving ability but also ensures the high transmission efficiency of the bicycle; Due to the secondary transmission system, the highest speed ratio can reach more than 1:7, and the speed matching can reach more than 50 km/h or even higher.

A sun gear 4 is fixedly installed on the tower footing 17 of the rear axle 15 of the bicycle; one side of the sun gear 4 is provided with a planet carrier 5, and the planet carrier 5 is installed with planetary twin gears 6; the axial outer side of the planet twin gears 6 is matched with a ring gear 7; the axial outer side of the planet carrier 5 is provided with a ratchet wheel 8, and the ratchet wheel 8 is matched with a pawl 9; the pawl 9 is installed on the bicycle stand 1; the control of the pawl 9 is adjusted by the speed governor next to the handlebar of the bicycle to which a variable speed wire rope 13 is drawn, and the pawl 9 and the ratchet wheel 8 are separated or combined to switch between the primary transmission state and the secondary transmission state through the retraction and extension of the variable speed wire rope 13; the axial outer side of the ring gear 7 is provided with a pin coupling A 10; a main sprocket 12 is also installed on the tower footing 17 of the rear axle 15 of the bicycle, and the inside of the main sprocket 12 is installed with a one-way bearing 18, to realize the primary transmission and solve the problem of unsynchronized rotation speed of the main sprocket 12 and the tower footing 17 in the working state of the secondary transmission; the main sprocket 12 is further provided with a pin coupling B 11; the main sprocket 12 and the ring gear 7 are connected by the pin coupling to transmit the power of the main sprocket 12.

The basic principles and main features of the invention have been described hereinabove Those skilled in the industry should understand that the invention is not limited by the above embodiments; the foregoing embodiments and the description in the specification only illustrate the principle of the invention. Various changes and improvements may be made to the invention without departing from the spirit and scope of the invention, and these changes and improvements fall within the scope of the claimed invention. The scope of protection claimed by the invention is defined by the appended claims and equivalents thereof.

What is claimed is:

1. An automatic downshifting and variable speed transmission bicycle, comprising a bicycle stand, wherein the bicycle stand is installed with a bottom bracket; the bottom bracket is installed with a bottom bracket sprocket set, and the bottom bracket sprocket set is composed of three chain discs of different sizes; a main sprocket is further installed side-by side a ring gear, the inside of the main sprocket is installed with a one-way bearing; a rear axle of the bicycle is provided with a tower base, and the tower base is fixedly installed with a sun gear; a sun gear of a planetary transmission is provided with a planet carrier, and the planet carrier is installed with planetary twin gears; the planetary twin gears are intermeshed and one of the twin gears is meshed with the ring gear in the radial direction; an axial outer side of the planet carrier is provided with a ratchet wheel, and the ratchet wheel is selectively engaged with a pawl; the pawl is installed on the bicycle stand; the control of the pawl is adjusted by a speed governor next to a handlebar of the bicycle to which a variable speed wire rope is connected, and the pawl and the ratchet wheel are separated or combined to switch between a primary transmission state and a secondary transmission state through the retraction and extension of the variable speed wire rope; provide variable speed via the planetary transmission.

2. The automatic downshifting and variable speed transmission bicycle according to claim 1, wherein the sun gear is fixed on the tower base of the rear axle of the bicycle; the ring gear and the planet carrier are respectively located on a radially outward side of the sun gear.

3. The automatic downshifting and variable speed transmission bicycle according to claim 1, wherein the main sprocket is connected to a power input system composed of the bottom bracket sprocket set via a chain; when the ratchet wheel and the pawl are separated, the ratchet wheel follows the main sprocket to rotate, and the planetary transmission does not intervene in operation; at this time, the power is directly transmitted by the main sprocket through the one-way bearing to the tower base to drive the bicycle forward, so the primary transmission state is constituted.

4. The automatic downshifting and variable speed transmission bicycle according to claim 1, wherein the main sprocket is connected to a power input system composed of the bottom bracket sprocket set via a chain.

5. The automatic downshifting and variable speed transmission bicycle according to claim 1, wherein the movement of the pawl is completed by the variable speed wire rope, and the direction of the variable speed wire rope is parallel to a rear brake wire rope; a brake linkage device is installed between the variable speed wire rope and the brake wire rope; the brake linkage device comprises the variable speed wire rope, a variable speed wire rope weight, the rear brake wire rope, the brake linkage device, and a variable speed wire rope weight base; during the braking process of a rear brake device, the variable speed device is activated and switched to the primary transmission state, and the process of automatic downshift is completed.

* * * * *